US005743542A

United States Patent [19]

Mast et al.

[11] Patent Number: 5,743,542

[45] Date of Patent: Apr. 28, 1998

[54] REFUSE CONTAINER HAVING RETRACTABLE WHEEL ASSEMBLY

[75] Inventors: Rex Mast, Orrville; Trevor Rasmussen, Fairlawn, both of Ohio

[73] Assignee: Rubbermaid Incorporated, Wooster, Ohio

[21] Appl. No.: 594,153

[22] Filed: Jan. 31, 1996

[51] Int. Cl.[6] .......... B62B 1/00

[52] U.S. Cl. .......... 280/47.26; 280/79.2; 280/43

[58] Field of Search .......... 280/659, 43, 43.1, 280/43.11, 47.26; D34/25, 1, 5, 7; 220/625, 908, 909, 910, 911, DIG. 2, DIG. 4

[56] References Cited

U.S. PATENT DOCUMENTS

| | | | |
|---|---|---|---|
| D. 218,359 | 8/1970 | Marsh | D49/35 |
| D. 231,184 | 4/1974 | Brown et al. | D7/189 |
| D. 233,127 | 10/1974 | Karn | D7/194 |
| D. 234,288 | 2/1975 | Kay et al. | D7/191 |
| D. 253,932 | 1/1980 | Mockler | D7/194 |
| D. 260,229 | 8/1981 | Maza et al. | D7/189 |

(List continued on next page.)

OTHER PUBLICATIONS

Sell sheet, Wheeled refuse container; Toter Incorporated, P.O. Box 5338, 841 Meacham Road, Statesville, North Carolina 28677., Publication date Apr., 1992.

Sell sheet, Wheeled refuse containers; Zarn Inc., Reidsville, North Carolina. Publication date Jun., 1992.

Sell sheet, Wheeled refuse containers; Zarn Inc., Reidsville, North Carolina. Published at least as early as May 13, 1993.

Price List, Wheeled refuse container; Contico Manufacturing Company, 1101 Warson Road, St. Louis, Missouri 63132. Publication date Aug. 1, 1986.

(List continued on next page.)

*Primary Examiner*—Richard M. Camby

*Attorney, Agent, or Firm*—Richard B. O'Planick

[57] ABSTRACT

A container (10) is disclosed having a pair of spaced apart flanges (28, 29) through each of which a J-shaped slot (30) extends. Each slot (30) has an inboard end (32) proximate the vertical centerline of the container and an outboard end (34) positioned a greater distance from the centerline. A wheel assembly axle rod (52) extends through the slots (30) and wheels (46, 48) are affixed to opposite ends of the axle rod. The axle rod (52) moves between the inboard end (32) of the slot wherein the wheels (46, 48) lie within the footprint of the container sidewalls (12) and the outboard end (34) of the slot wherein the wheels (46, 48) project rearward beyond a rearward sidewall (19) of the container. With the wheel assembly in the inboard position, the container is nestable with a like-configured second container without interference with the wheels; and with the wheel assembly in the outboard position, the wheels are positioned outward for enhanced tipping stability and for easier support of the load carried in the container.

30 Claims, 6 Drawing Sheets

U.S. PATENT DOCUMENTS

| | | | |
|---|---|---|---|
| D. 271,248 | 11/1983 | Maza et al. | D34/8 |
| D. 280,459 | 9/1985 | McClelland | D34/1 |
| D. 281,111 | 10/1985 | McClelland | D34/1 |
| D. 292,638 | 11/1987 | Carville | D34/5 |
| D. 312,161 | 11/1990 | Toscano | D34/11 |
| D. 312,523 | 11/1990 | Delmerico et al. | D34/7 |
| D. 315,626 | 3/1991 | Delmerico et al. | D34/5 |
| D. 318,354 | 7/1991 | Delmerico | D34/7 |
| D. 321,576 | 11/1991 | Hradisky | D34/8 |
| D. 322,350 | 12/1991 | Craft et al. | D34/9 |
| D. 323,912 | 2/1992 | Delmerico | D34/5 |
| D. 323,914 | 2/1992 | Doxey et al. | D34/5 |
| D. 324,595 | 3/1992 | Beese et al. | D34/5 |
| D. 326,342 | 5/1992 | Doxey et al. | D34/7 |
| D. 327,555 | 6/1992 | Juergens | D34/1 |
| D. 329,930 | 9/1992 | Delmerico et al. | D34/7 |
| D. 332,852 | 1/1993 | Delmerico | D34/9 |
| D. 335,562 | 5/1993 | Evans | D34/7 |
| D. 345,837 | 4/1994 | Bean | D34/5 |
| D. 347,095 | 5/1994 | Apps et al. | D34/5 |
| D. 349,795 | 8/1994 | Schauer et al. | D34/5 |
| D. 355,511 | 2/1995 | Cassel | D34/1 |
| D. 355,514 | 2/1995 | Breen | D34/1 |
| D. 355,741 | 2/1995 | Craft et al. | D34/5 |
| D. 357,779 | 4/1995 | Breen | D34/1 |
| D. 365,427 | 12/1995 | Brightbill et al. | D34/1 |
| 4,351,539 | 9/1982 | Rodolakis | 280/47.26 |
| 4,450,976 | 5/1984 | Snyder et al. | 220/343 |
| 4,558,799 | 12/1985 | Hammond | 220/343 |
| 4,600,113 | 7/1986 | DeMars | 220/1 |
| 4,749,101 | 6/1988 | Durkan, Jr. | 220/337 |
| 4,819,827 | 4/1989 | DiSesa | 220/318 |
| 4,836,394 | 6/1989 | Glomski | 220/1 |
| 4,930,649 | 6/1990 | Moser | 220/1 |
| 4,930,653 | 6/1990 | Machado | 220/23.4 |
| 5,031,796 | 7/1991 | Schafer et al. | 220/571 |
| 5,071,024 | 12/1991 | Delmerico et al. | 220/335 |
| 5,088,750 | 2/1992 | Beese et al. | 280/47.26 |
| 5,103,994 | 4/1992 | Doxey et al. | 220/324 |
| 5,150,806 | 9/1992 | Glomski | 220/331 |
| 5,217,136 | 6/1993 | Sanden | 220/337 |
| 5,251,779 | 10/1993 | Schmidt | 220/656 |
| 5,323,923 | 6/1994 | Schauer | 220/337 |
| 5,356,027 | 10/1994 | Craft et al. | 220/338 |
| 5,599,037 | 2/1997 | Spickler | 280/43.1 |

OTHER PUBLICATIONS

P. 3, Wheeled refuse container; Continental Manufacturing Company, 123 Byassee Drive, Hazelwood, Missouri 63042. Published at least as early as Oct., 1994.

Catalog page, Refuse containers; Fesco Plastics Corporation, Inc., 14849 Salt lake Avenue, City of Industry, California 91746. Publication date 1984.

Sell sheet, Wheeled refuse containers; Tucker Housewares, 25 Tucker Drive, Leominster, Massachusetts 01453. Published at least as early as May, 1994.

P. 10, Wheeled refuse container; Tucker Housewares, 25 Tucker Drive, Leominster, Massachusetts 01453. Published at least as early as May, 1994.

Sell sheet, Wheeled refuse containers; Tucker Housewares, 25 Tucker Drive, Leominster, Massachusetts 01453. Published at least as early as Apr., 1995.

Sell sheet, Wheeled refuse containers; Tucker Housewares, 25 Tucker Drive, Leominster, Massachusetts 01453. Publication date 1994.

Sell sheet, Wheeled refuse container; Sears, Roebuck and Co., Chicago, Illinois 60684. Published at least as early as 1993.

Catalog page, Wheeled refuse containers; Reuter, Inc., 410–11th Avenue South, Hopkins, Minnesota 55343. Publication date 1989.

Sell sheet, Wheeled refuse container; Bonar Plastics Ltd., address unknown. Published at least as early as 1993.

Sell sheet, Wheeled refuse container; Handelsonderneming Kiggen B.V., Den Engelsman 1, Postbus 2624, 6026 ZB Maarheeze. Published at least as early as 1993.

Sell sheet, Wheeled refuse container; Pawnee Products, A Division of Pawnee Industries, Inc., 433 Industrial Road, Goddard, Kansas 67052. Published at least as early as 1993.

Catalog page, Wheeled refuse container; Curver, Takkebijsters 75, Postbus 6810, 4802 HV Breda, Netherlands. Publication date 1991.

Pp. 28 and 29, Wheeled refuse containers; Rubbermaid Incorporated, 1147 Akron Road, Wooster, Ohio 44691. Publication date 1990.

REFUSE CONTAINER HAVING RETRACTABLE WHEEL ASSEMBLY

BACKGROUND OF THE INVENTION

1. Field of the Invention

The subject invention relates generally to wheeled containers and, more specifically, to wheeled refuse containers.

2. The Prior Art

Wheeled refuse containers are well known consumer products. Typically such containers comprise an elongate, generally cylindrical body to which a wheel assembly is mounted at one end of the bottom for enabling the container to be easily moved along the ground. The container is formed to provide a handle above the wheel assembly whereby the container can be tipped backward over the wheels, and thereafter pushed or pulled along the ground.

The position of the wheel assembly relative to the bottom of the container has proven to be problematic in commercially available containers. It is desirable that such containers be nestable so that the space required, and consequent cost, for their transportation is minimized. In order to make the containers nestable to an optimal degree, the wheel assembly must be mounted inward of the container bottom footprint so as to not interfere when one container is nested within a like-configured second container.

Placing the wheel assembly inboard, however, while optimizing the nesting capability of the container, can cause the container to be unstable in use. An unstable situation can result because the container wheels, if positioned within the container footprint, create a narrow base on which to support the container. Thus, when the container is upright, the narrow base makes the container susceptible to tipping.

Solving the above problem can be effected by positioning the wheels more outboard and extending the wheels out beyond the rearward sidewall of the container. In that alignment, the support base of the container is substantially widened, enhancing the stability of the container in the upright position. However, extending the wheels outward into a more stable configuration makes the container less nestable, causing the cost of shipping the container to rise.

SUMMARY OF THE INVENTION

The present invention overcomes the aforementioned shortcomings in commercially available wheeled refuse containers by providing a container having a retractable wheel assembly. A container body is formed to provide a pair of spaced apart flanges, each of which having formed therein a J-shaped keyway slot. The slots are configured to provide an inboard end that is relatively proximate the vertical center line of the container, and an elevated outboard slot end that is located an increased distance from the container center line.

A wheel assembly is provided comprising an elongate axle rod dimensioned for close receipt through the keyway slots and having a wheel affixed to each rod end. The wheel assembly moves along the slots from an inwardmost retracted position in which the wheels lie within the footprint of the container sides. With the wheels in the retracted position, the containers are fully nestable and the wheels of the superior container do not interfere with the sides of the container below.

The wheel assembly can be moved along the slots into an extended position, finally reaching the outwardmost end of the slots. Thus positioned, the wheels together with the bottom of the container create a wide base on which to support the container. In the extended position, the wheels extend beyond the container rearward sidewall and serve to widen the support platform of the container, making it more stable and less prone to tipping when in the upright condition.

Shoulders protrude into the keyway slots proximate each end, forming sockets in the slots into which the axle rod snaps. The rod is thus maintained in either the retracted position or extended position, at the user's election, until the rod is manually forced over the slot protrusions and thereby freed to move along the keyway slots into a new position. The ends of the slots are level with each other, connected by an lower intermediate portion. The J-shape of the slot makes the outboard end of the slot extend in a vertical direction. Hence, the vertical orientation of the slot at the outboard end acts to resist lateral forces applied to the axle rod that might otherwise inadvertently force the axle rod out of the outboard end of the slots.

Accordingly, it is an objective of the present invention to provide a fully nestable wheeled refuse container.

A further objective is to provide a wheeled refuse container having a retractable wheel assembly.

Still another objective is to provide a wheeled refuse container having a relatively large support platform for stability.

Another objective is to provide a wheeled refuse container having a wheel assembly that moves toward and away from the vertical centerline of the container.

Yet a further objective is to provide a refuse container having integrally formed means for supporting a retractable wheel assembly in both a retracted and extended condition.

An additional objective is to provide a refuse container having integral locking means for maintaining a retractable wheel assembly in either a retracted or extended condition.

An objective is also to provide a refuse container having a retractable wheel assembly, repositionable between a retracted and extended condition, which is fully nestable with a like configured additional container, and which is economically and readily produced, assembled, and readily reconfigurable by the end user.

These and other objectives, which will be apparent to those skilled in the art, are achieved in a preferred embodiment which is described in detail below and illustrated in the accompanying drawings.

DESCRIPTION OF THE ACCOMPANYING DRAWINGS

DESCRIPTION OF THE PREFERRED EMBODIMENT

Figure 1:
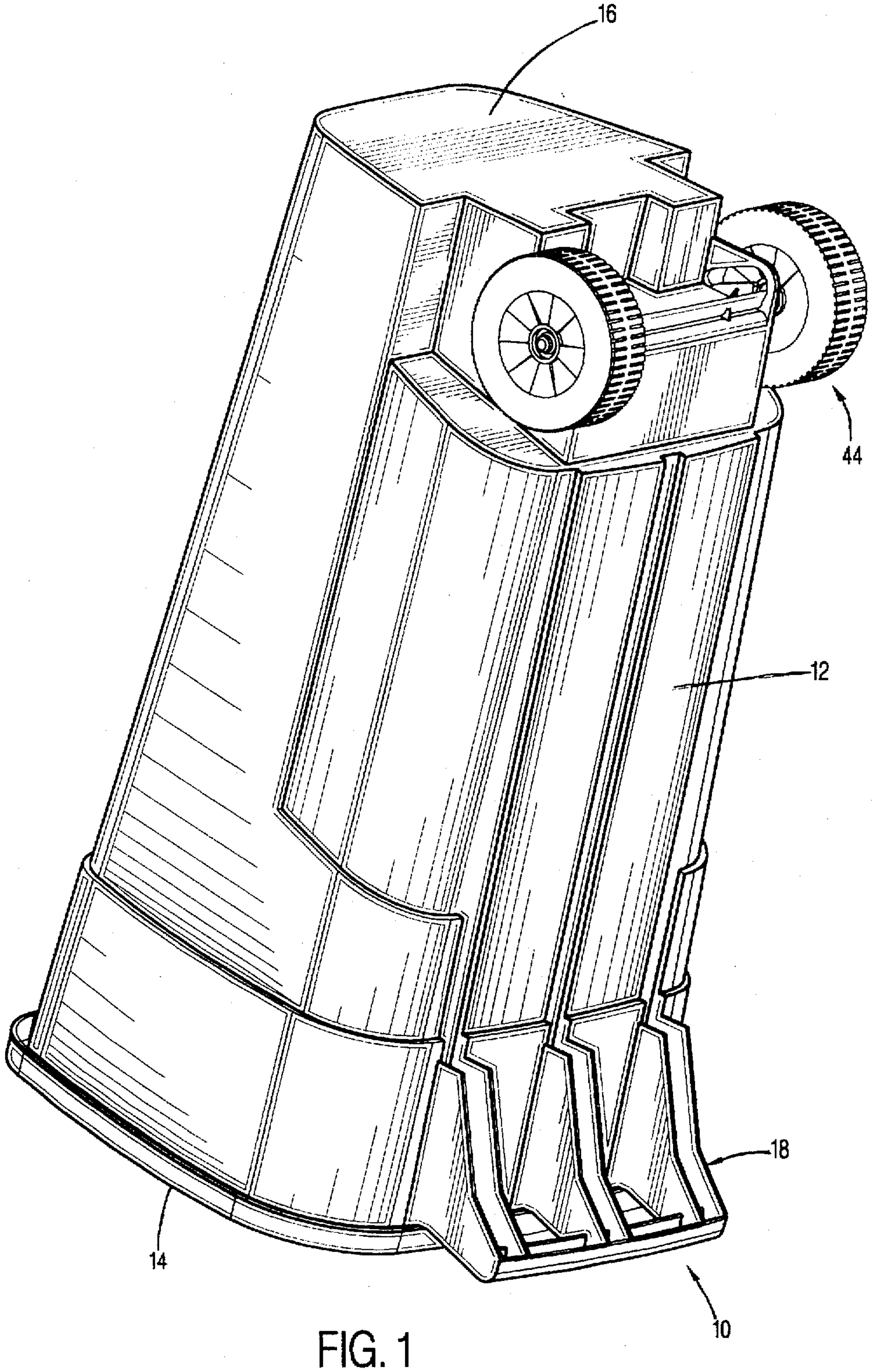
FIG. 1 is an assembled perspective view of the subject container, showing the wheel assembly in the extended position.
Figure 3:
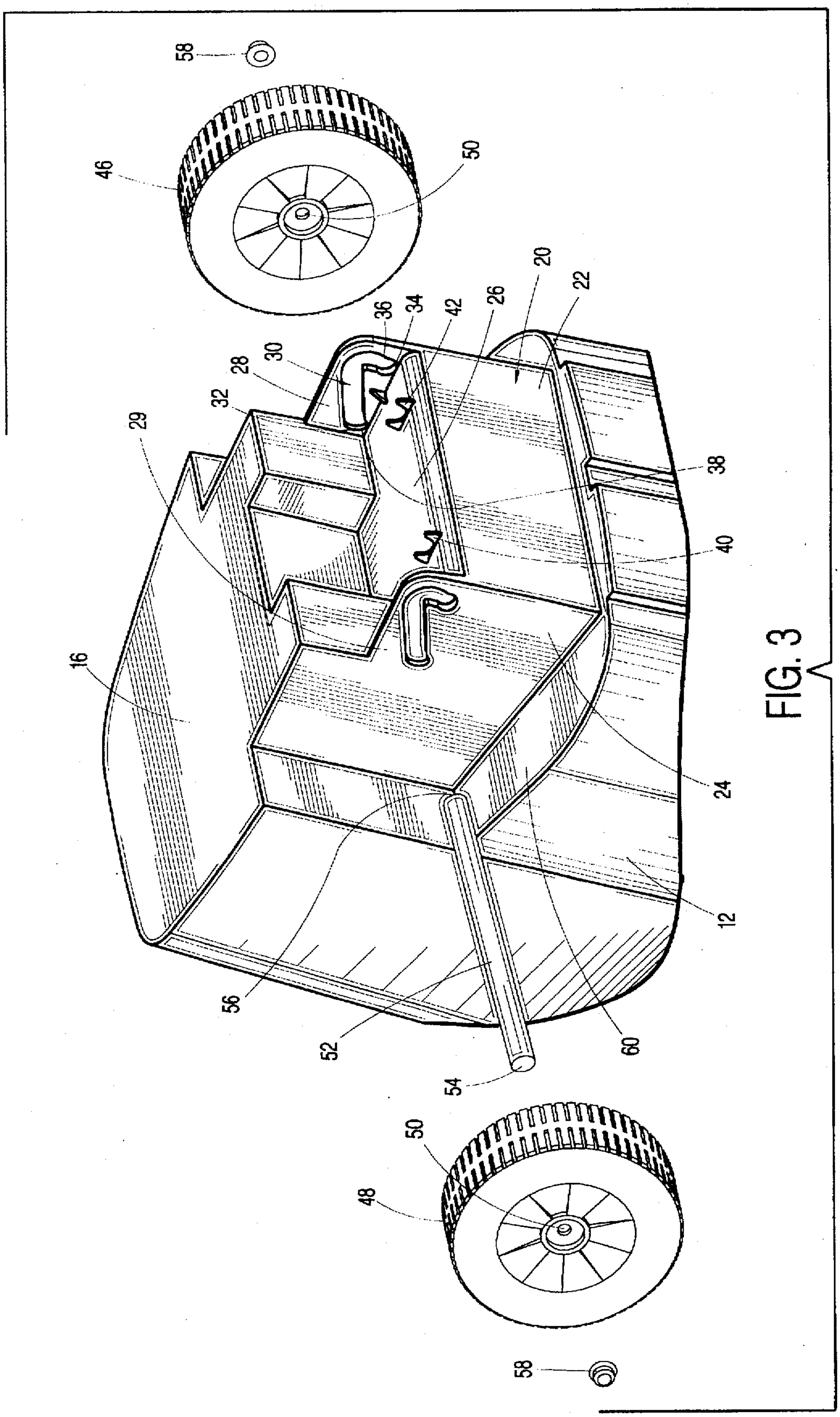
FIG. 3 is an enlarged exploded perspective view of the wheel assembly and the lower portion of the container to which it attaches.
Figure 6:
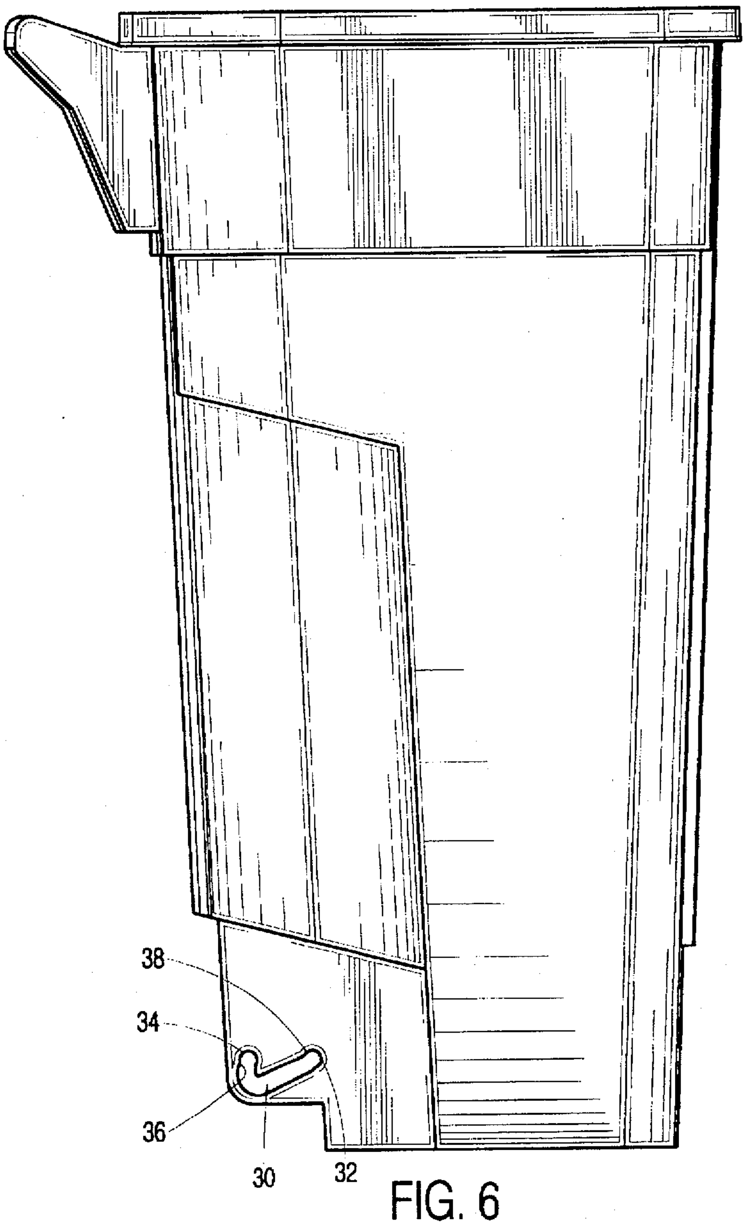
FIG. 6 is a side elevational view of the subject container with the wheel assembly removed.

Referring first to FIGS. 1 3, and 6, the subject refuse container 10 is shown to be of generally cylindrical construction, formed of conventional plastics material such as polyethylene by conventional molding methods such as injection molding. The container includes sidewalls 12 that extend downward from an upper peripheral rim 14 to a bottom pedestal surface 16. The sidewalls 12 and bottom surface 16 define an upwardly opening internal chamber.

An elongate handle 18 spans a rearward sidewall 19 of the container, and the handle projects outward a sufficient distance away from the container to enable a user to manually grasp the handle 18 for lifting or moving the can.

As best seen in FIG. 3, the rearward sidewall 19 steps inward at the bottom to a wheel support block 20, defined by a rearward facing panel 22, side panels 24 (one of which shown), and a downward facing panel 26. First and second support flanges 28, 29 project downward from opposite edges of the panel 26, each flange having a J-shaped keyway slot 30 extending therethrough. The slots 30 are configured to provide a linear portion that projects downwardly at an angle from an inboard slot end 32 and merges into a bend and vertical portion that terminates at an outboard slot end 34. The ends 32 and 34 of each slot 30 are substantially the same elevation above the bottom surface 16 of the container but the slot between ends 32, 34 angles downward and then bends upward.

A pair of shoulder protrusions 36, 38 project into each of the slots 30 proximate the ends 32, 34, respectively. The shoulder protrusions 36, 38 constrict the slots and define end portions of the slots for a purpose explained below. With continued reference to FIG. 3, a pair of spaced apart and aligned U-shaped axle sockets 40, 42 project downward from the surface 26. More or less than two sockets of the type represented at 40, 42 may be employed if so desired. The sockets 40, 42 and outboard ends 34 of each slot 30 are in co-linear alignment as shown.

The wheel assembly is shown to comprise a pair of molded plastic wheels 46, 48, each having an axial throughbore 50. An elongate axle rod 52, preferably of steel, is provided, and ends 54, 56 of the rod 52 are assembled through respective slots 30 of the container. Thereafter, the ends 54, 56 are inserted through the bore 50 of the wheels 46, 48 and retained in position by end caps 58. So assembled, the rod 52 can move laterally within the slots 30 and the wheels 46, 48 are free to rotate about the axle rod 52.

Figure 2:
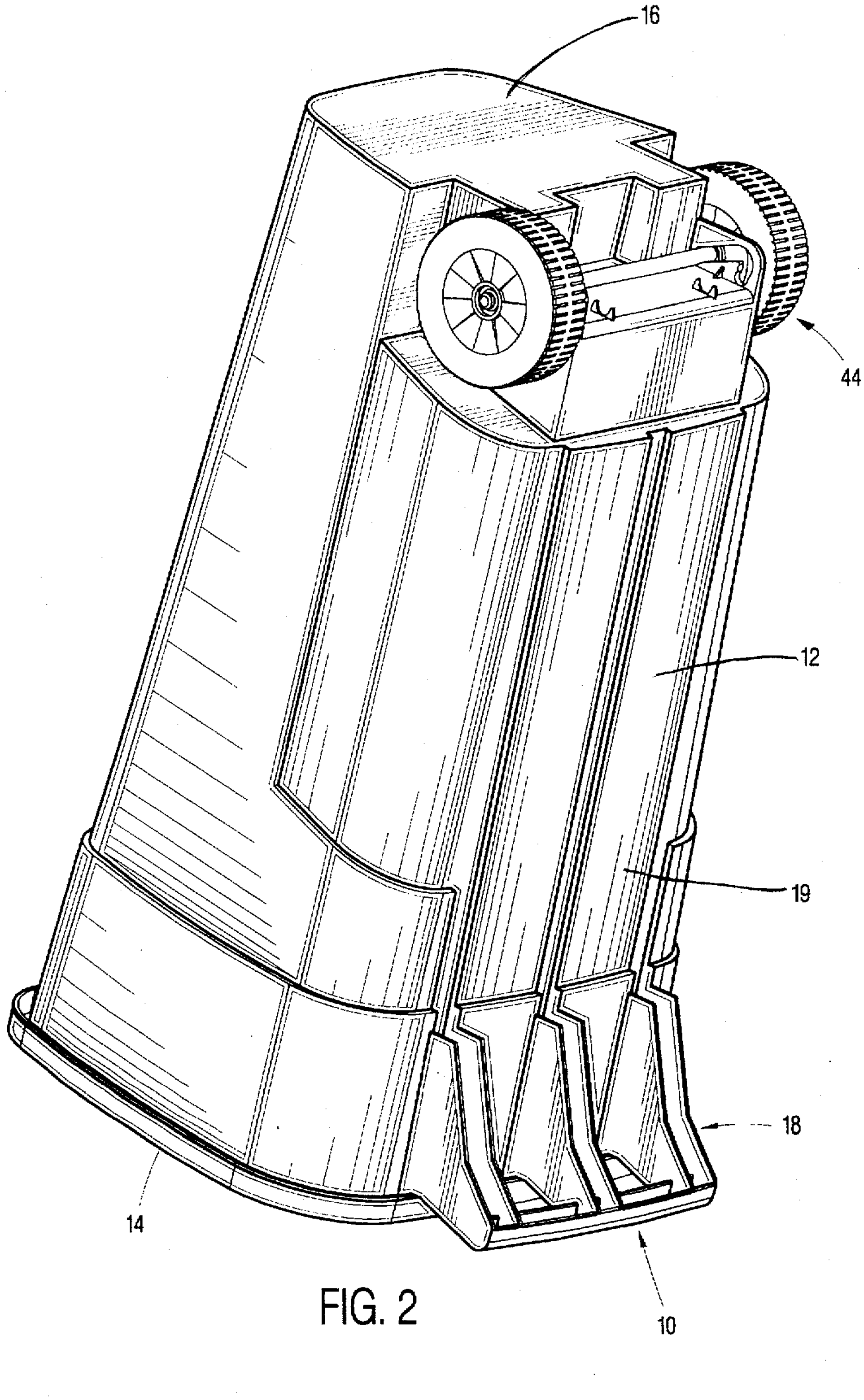
FIG. 2 is an assembled perspective view of the container showing the wheel assembly in the retracted position.
Figure 5:
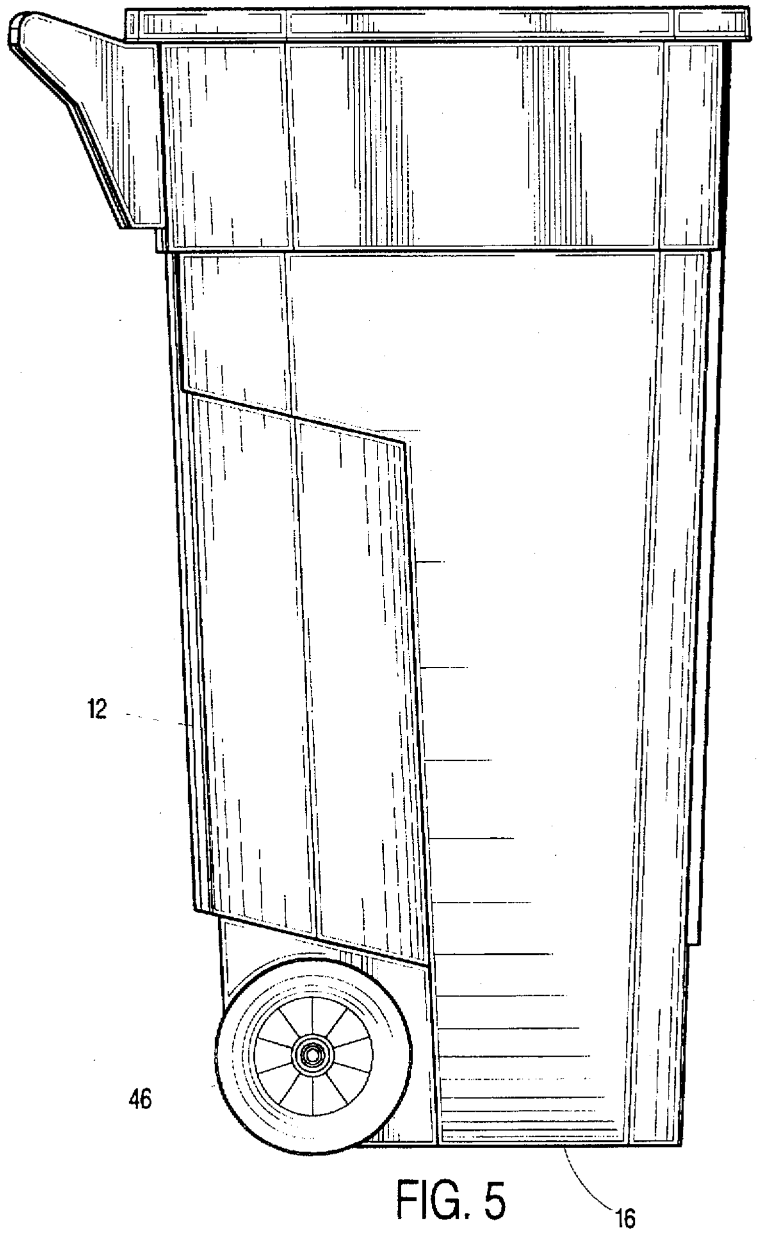
FIG. 5 is a side elevational view with the wheel assembly in the retracted position.

FIGS. 2 and 5 depict the assembled container with the wheel assembly in the retracted, or nesting position. So positioned, the axle rod 52 resides at the inboard end 32 of the slots 30. The rod 52 is forced manually over the shoulder 38 which, being formed of resilient plastic material, allows the rod 52 frictionally thereover and into the slot end 32. The shoulder 38 retains the rod in its retracted position at end 32 until it is manually forced back over the shoulder 38 and into the main portion of the slot 30.

It will be appreciated that, in the retracted or nesting position, the wheels 46, 48 lie within the footprint of the container, inward of the rearward container wall 19. The bottom of the wheels are substantially coplanar with the bottom surface 16 of the container as well. Accordingly, one of the containers may be inserted into a like-configured second container without the wheels 46, 48 interfering. The superior one of the nested containers can be fully inserted into the underlying container up to the handle area without encountering resistance from the wheels. So nested, the containers consume a minimum amount of space and can therefore be economically transported.

It will further be appreciated that while the wheels in the retracted position are optimally oriented for shipping purposes, they are not so well suited for stabilizing. It will be seen from FIGS. 2 and 5 that the retracted wheels are inboard of the container handle, and closer to the vertical axial center line of the container. As such, the wheels and support surface 16 create a relatively narrow support base for the container. A narrow support base makes the container prone to inadvertent tipping; a disadvantage to the end user.

The wheel assembly can be adjusted pursuant to the subject invention to avoid the aforementioned deficiency while still preserving the high degree to which the containers nest. The axle rod 52 can be manually forced over the shoulder 38 and thereafter moved from the inboard end 32 of the slots to the outboard end 34 of the slots. Upon reaching the outboard end 34, the axle rod 52 is manually forced over the slot shoulder 36 and retained in the slot ends 34. Simultaneously, the axle rod 52 is seated within the sockets 40, 42, which provide additional support to the rod. In traversing the keyway slots 30, the axle rod, and correspondingly the wheels 46, 48 are moved outboard, away from the vertical centerline of the container, creating a wider, and hence more stable, support platform. The container is thereby rendered less prone to tipping when in the upright condition.

Figure 4:
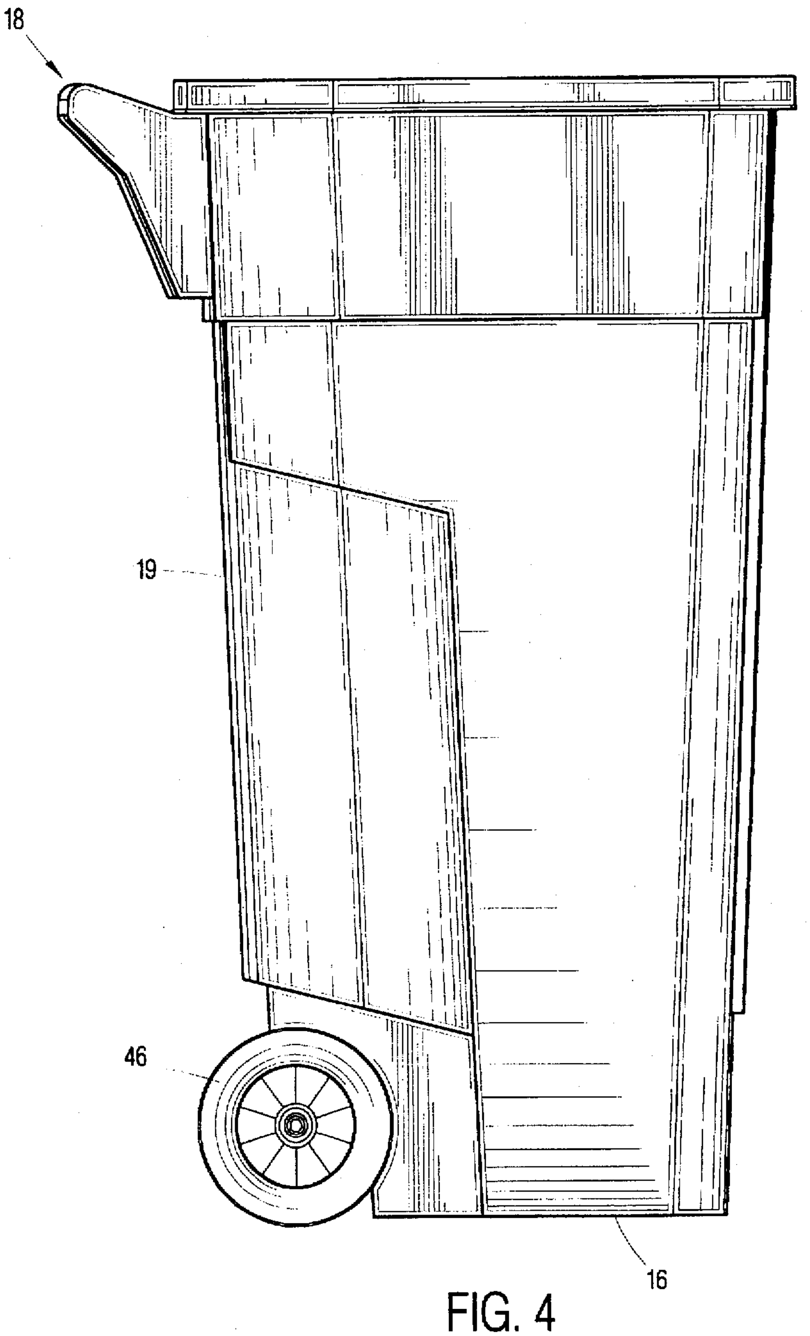
FIG. 4 is a side elevational view with the wheel assembly in the extended position.

Terminally positioned at slot ends 34, the wheels 46, 48 are at a substantially greater distance from the container centerline and project outward beyond the rear sidewall 19 of the container, as best seen in FIG. 4. The lower surfaces of the wheels depend a slight distance below the support pedestal surface 16. With support surface 16, the wheels 46,48 create a tripod contact with the ground surface. By spacing the wheels 46,48 a greater distance from the container centerline, and thus the surface 16, the tripod is expanded and the stability of the container enhanced.

The wheel assembly can be moved backward and forward in the slots 30, between the inboard and outboard positions at any time, if so desired by the user. Also, while the slots are preferably J-shape, oriented as shown, other shaped slots may be used if so desired, without departing from the teachings of the invention. By way of example, without limitation, a linear slot can be employed, or a U-shaped or a V-shaped slot. The J-shape of slots 30 causes the segment at the outboard end 34 to be vertical, defined by vertical slot sides. The appliction of externally originating forces to the axle rod will generally be in the horizontal direction. However, because of the shape of the slot at the end 34, a horizontally directed force vector applied to the axle rod will not act to dislodge the rod from its position at end 34. Only a downwardly directed force (the most unlikely of directions) will cause a downward movement of the axle rod. The shape of the slots 30 therefore serve to minimize any unintentional movement of the axle rod out of the slot ends 34. In addition, while two flanges 28, 29 are shown in the preferred embodiment, presenting two slots 30, more or less slots can be utilized if so desired.

It will be appreciated that the bottom of the wheels 46, 48 are slightly below level with the bottom of the bottom pedestal 16 with the wheel assembly in either the inboard or the outboard ends of the slots. Thus, the wheels of an upper container, when nested in a lower container, will engage the horizontal support ledge 60 of the underlying container, as will be understood from FIG. 3. The pedestal portion 16 of the upper container will fit within the pedestal portion of the underlying container as well. Because the wheels 46, 48 are within the footprint of the container sidewalls, they do not interfere with the sidewalls of the underlying container, but proceed unobstructed downward until engaging the surface ledge 60 of the underlying container.

The subject invention provides a wheeled container with optimal wheel assembly location for both nesting and operational modes of use. It does so by providing adjustment means that changes the distance between the axle rod and the vertical center axis of the container. The adjustment means is integral with the container and requires no hardware or assembly. In addition, the adjustment means is reversible and incorporates locking shoulders for maintaining the axle rod in either end of the slots at the preference of the user.

While the above describes the preferred embodiment of the present invention, the subject invention is not intended to be so limited. Other embodiments, which will be apparent to those skilled in the art and which utilize the teachings herein set forth, are intended to be within the scope and spirit of the invention.

We claim:

1. A wheeled storage container comprising:

a container comprising sidewalls that extend from an upper rim to a bottom floor surface and define between the sidewalls an internal storage compartment;

a wheel assembly comprising an elongate axle rod and first and second spaced apart wheels connected to opposite ends of the axle rod;

at least one axle rod receiving slot formed in a lower end of the container, the slot having a concave shape relative to the bottom floor surface, the slot further having an inboard end and an outboard end and a width dimension sufficient to closely receive the wheel assembly axle rod therethrough, the axle rod moving along the slot from an inwardmost nested position to an outwardmost operational position, whereby increasing the distance between the wheels and an axial centerline of the container body.

2. A storage container according to claim 1, wherein the slot having first locking means for retaining the axle rod in the outboard end of the slot.

3. A storage container according to claim 2, wherein the locking means comprising a first shoulder protruding into the slot proximate the outboard end of the slot and constricting the width of the slot at the shoulder, whereby entrapping the axle rod in the outboard end of the slot.

4. A storage container according to claim 3, wherein the slot having second locking means for retaining the axle rod in the inboard end of the slot, comprising a second shoulder protruding into the slot proximate the inboard end of the slot and constricting the width of the slot at the second shoulder, whereby entrapping the axle rod in the inboard end of the slot.

5. A storage container according to claim 4, wherein the first and second shoulders flex outwardly to allow the axle rod to pass thereover, whereby freeing the axle rod to move along the slot.

6. A storage container according to claim 1, wherein the slot inboard end is level with the slot outboard end.

7. A storage container according to claim 6, wherein the slot has an elongate J-shape configuration, and a slot segment forming the outboard end extends in a vertical direction.

8. A storage container according to claim 1, wherein with the axle at the inboard end of the slot, the wheels are disposed within a container footprint defined by the container sidewalls.

9. A storage container according to claim 6, wherein with the axle at the outboard end of the slot, the wheels extend outward and beyond a container rearward sidewall.

10. A storage container according to claim 7, wherein with the axle at the outboard end of the slot, the bottom of the wheels are substantially level with the bottom floor surface of the container.

11. A storage container according to claim 8, wherein further comprising a handle connected to the container rearward sidewall proximate the container upper rim.

12. A wheeled container comprising:

an elongate container body comprising sidewalls that extend from an upper rim to a bottom floor surface an internal storage compartment defined by the sidewalls and floor surface; a wheel assembly comprising an elongate axle rod and at least one wheel connected to the axle rod;

at least one axle rod receiving slot formed in a lower end of the container, the slot having a concave shape relative to the bottom floor surface, the slot further having an inboard end and an outboard end and a width dimension sufficient to closely receive the wheel assembly axle rod therethrough, the axle rod moving within the slot and carrying the wheel from the inboard end of the slot to the outboard end of the slot, whereby altering the distance between the wheel and an axial centerline of the container body.

13. A wheeled container according to claim 12, wherein the slot has an elongate J-shape configuration and the outboard slot end is defined by a vertically extending slot segment and terminates at a level substantially coplanar with the inboard slot end, whereby the wheel is positioned at the same level at the outboard slot end and the inboard slot end.

14. A wheeled container according to claim 12, wherein the wheel extends outward and beyond a rearward sidewall of the container with the axle rod at the outboard slot end and the wheel resides inward of the rearward sidewall with the axle rod at the inboard slot end.

15. A wheeled container according to claim 12, wherein the slot has first and second locking means for retaining the axle rod in the inboard and the outboard ends of the slot, respectively.

16. A wheeled container according to claim 13, wherein the first and second locking means comprising first and second shoulder protrusions projecting into the slot proximate the inboard and outboard ends of the slot, respectively, each protrusion constricting the width of the slot and entrapping the axle rod into a selective one of the slot ends.

17. A wheeled container according to claim 14, wherein the first and second shoulders flex outwardly to allow the axle rod to pass thereover, whereby freeing the axle rod to move along the slot.

18. A wheeled container comprising:

an elongate, generally cylindrical container body comprising sidewalls that extend from an upper rim to a bottom floor surface and an internal storage compartment defined by the sidewalls and floor surface;

a wheel assembly comprising an elongate axle rod and at least one wheel connected to the axle rod;

at least one axle rod receiving slot formed in a lower end of the container, the slot having a concave shape relative to the bottom floor surface, the slot further having an inboard end and an outboard end and a width dimension sufficient to closely receive the wheel assembly axle rod therethrough, the axle rod moving along the slot from an inwardmost nested position to an outwardmost operational position, whereby increasing the distance between the wheel and an axial centerline of the container body.

19. A wheeled container according to claim 18, wherein the slot has an elongate configuration in which the outboard and inboard ends are higher than an intermediate slot segment extending therebetween.

20. A wheeled container according to claim 18, wherein the wheel extends outward and beyond a rearward sidewall of the container with the axle rod at the outboard slot end and the wheel resides inward of the rearward sidewall with the axle rod at the inboard slot end.

21. A wheeled container according to claim 18, wherein the slot has first and second locking means for retaining the axle rod in the inboard and the outboard ends of the slot, respectively.

22. A wheeled container according to claim 19, wherein the first and second locking means comprising first and second shoulder protrusions projecting into the slot proximate the inboard and outboard ends of the slot, respectively, each protrusion constricting the width of the slot and entrapping the axle rod into a selective one of the slot ends.

23. A wheeled container according to claim 20, wherein the first and second shoulders flex outwardly to allow the axle rod to pass thereover, whereby freeing the axle rod to move along the slot.

24. A wheeled container comprising:

an elongate container body comprising sidewalls that extend from an upper rim to a bottom floor surface and an internal storage compartment defined by the sidewalls and floor surface;

a wheel assembly comprising an elongate axle rod and at least one wheel connected to the axle rod;

the axle rod mounting to an underside of the container body to move between an inboard position in which the wheel is located relatively close to a center of the container bottom floor surface and an outboard position in which the wheel is located relatively distant from the center of the container bottom floor surface, said inboard position and said outboard position being distanced substantially the same height above said floor surface; and the wheel and the container floor surface supporting the container in an upright position.

25. A container according to claim 24, wherein the wheel in the inboard position lies within a footprint of the container defined by the sidewalls.

26. A container according to claim 24, wherein the container having at least one axle rod receiving slot formed in a lower end of the container, the slot having an inboard end and an outboard end and a width dimension sufficient to closely receive the wheel assembly axle rod therethrough, the axle rod moves within the slot and carrys the wheel from the inboard end of the slot to the outboard end of the slot, whereby altering the distance between the wheel and the center of the container bottom floor surface.

27. A container according to claim 26, wherein the outboard end of the slot extends in a vertical direction.

28. A container according to claim 26, wherein the outboard and inboard ends of the slot are at higher level than an intermediate slot segment.

29. A container according to claim 26, wherein the slot is of generally J-shape.

30. A container according to claim 27, wherein the slot has means for releasably restraining the axle rod in the outboard end of the slot.

* * * * *